March 5, 1946.     H. A. KNOX     2,395,882
STEERING BRAKE
Filed Jan. 29, 1944     3 Sheets-Sheet 1

Inventor
Harry A. Knox

March 5, 1946.   H. A. KNOX   2,395,882
STEERING BRAKE
Filed Jan. 29, 1944   3 Sheets-Sheet 2
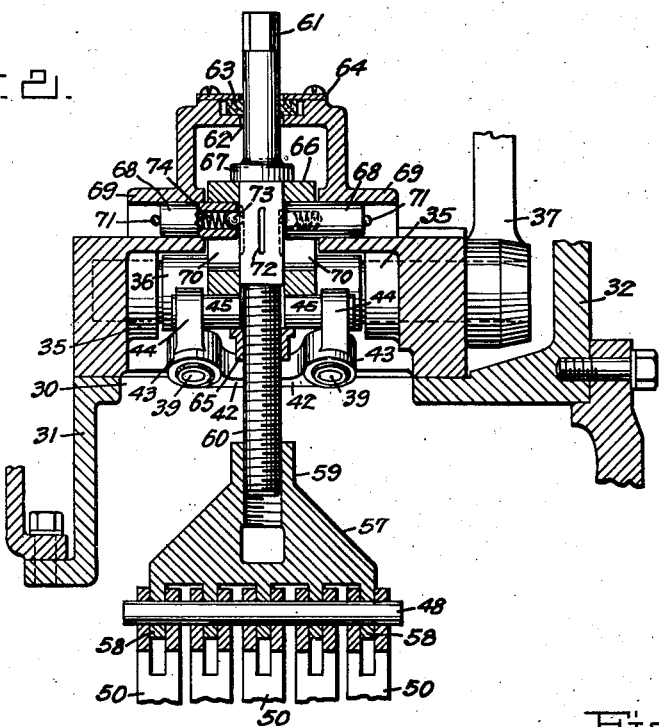
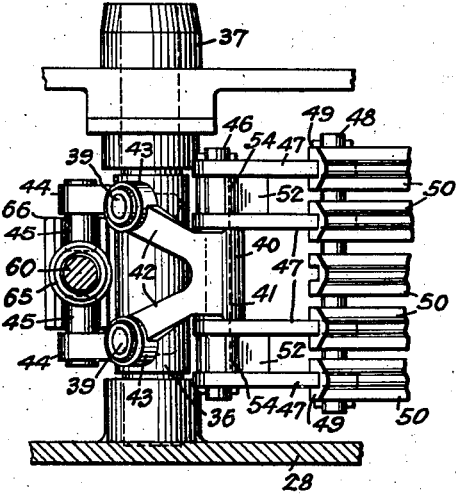
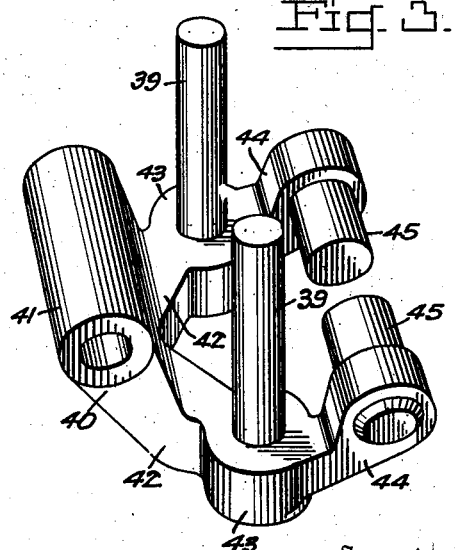
Inventor
Harry A. Knox

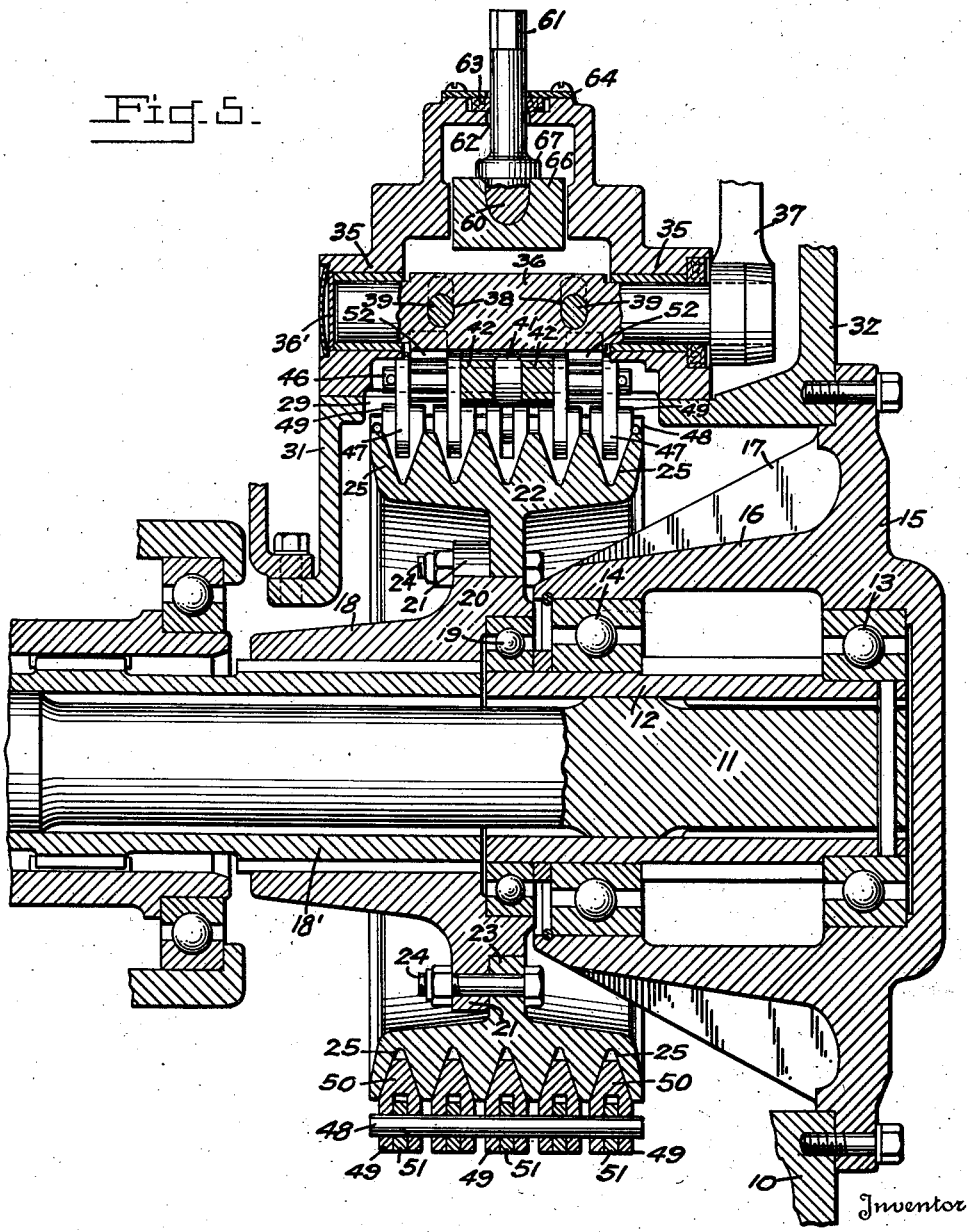

Patented Mar. 5, 1946

2,395,882

UNITED STATES PATENT OFFICE 2,395,882

STEERING BRAKE

Harry A. Knox, Washington, D. C.

Application January 29, 1944, Serial No. 520,168

8 Claims. (Cl. 188—77)

(Granted under the act of March 3, 1883, as amended April 30, 1928; 370 O. G. 757)

The invention described herein may be manufactured and used by or for the Government for governmental purposes without the payment to me of any royalty thereon.

The invention relates to brakes, and while in many respects applicable to general use, is specifically valuable for use in steering brakes for rugged transmissions commonly used in endless track tractive engines, such as "Bull-dozers," tractors, and military machines such as armored tanks, wherein steering is effected by selective braking or locking of one or the other of two traction elements between which a differential driving gear is connected. This type of steering has been common over a long period, and in most military uses involves severe load stresses and shock to the braking means. With the advent of "tanks" the brakes used operated well enough in those machines during the war of 1914-18. The great increase in armor, and armament, with accompanying greater size and heavier framing, increase in size of crews and auxiliary equipment and the recent requirements for high speeds accompanied by the installation of high power motors including airplane type radial motors, has shown the conventional brake totally inadequate. Limitation of space has made enlargement of common drums impracticable and excessive weight has also been a material factor making the solution of the problem of an adequate steering brake difficult.

It is therefore a paramount object of the invention to provide a brake adapted to oppose momentum inertia of the greatly augmented masses of tanks and their loads together with the augmented forces transmitted from the power plants of these machines, while at the same time avoiding the making of demands for increased space for the brake and also enabling its operation by the pedals and linkage heretofore used to operate smaller or less effective brakes, as well as avoiding requirement for greater extent of movement of pedals or the brake levers and linkages between the pedals and brake shoes.

In this direction it is an aim to give a multiple grooved drum brake with a novel form of shoe structure therefor, having characteristics contributing to increased effectiveness as well as affording greatly increased braking surface within a given axial dimension and diameter of drum.

A further animating motive is to present a new and effective linkage and force-amplifying means with anchorage, so constructed and organized that the added torque stresses are amply opposed and accommodated in a relatively reduced space and with a greatly simplified structure.

Another attainment of value is the encasement of the brake unit within a minimum space and weight of material, and embodying a novel coordination of case and operative parts.

It is a further valuable feature that the parts required are producible with an absence of complications in production and assembly, enabling the use of conventional practices in manufacture, and conventional forms of elements in large part.

Additional objects, advantages and features of invention lie in the construction arrangement and combination of parts involved in the embodiment of the invention, as will become apparent from the following description and drawings, wherein:

Figure 2 is an elevational view approximately in a plane with the line 2—2 of Figure 1;

Figure 3 is a detail perspective of one of the operating yokes;

Figure 4 is a section on the line 4—4 of Figure 1;

Figure 5 is a section on the line 5—5 of Figure 1.

Figure 1:
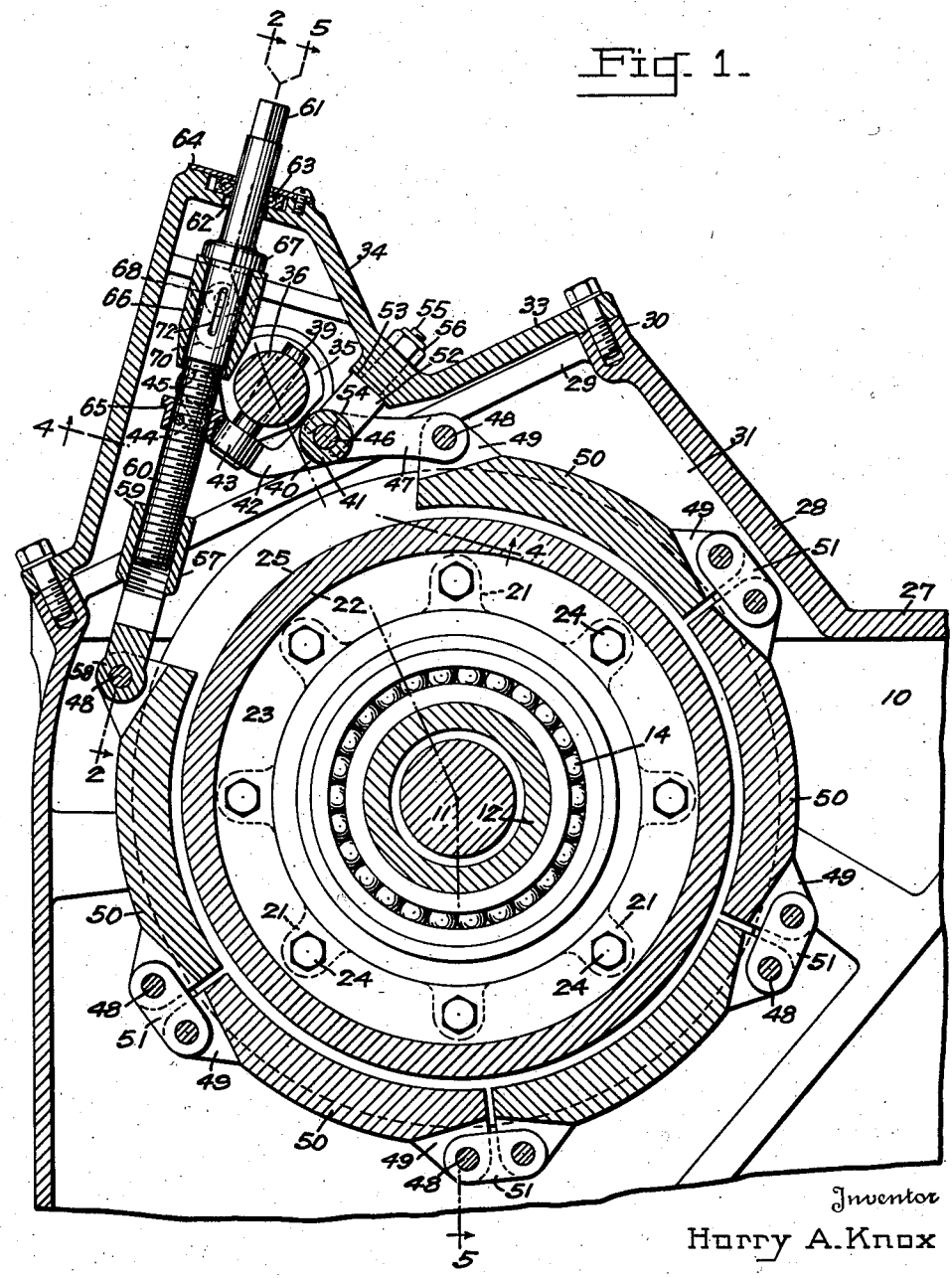
Figure 1 is a vertical sectional view of one embodiment of the invention.

Referring to the drawings, there is illustrated a case structure 10 in which there is journalled a shaft 11, which may be one of two coaxial counter shafts connected by the usual differential gearing (not shown) dividing the force received from a power plant. A sleeve gear 12 suitable for transmitting power to a tractive unit at one side of a vehicle is shown splined on the shaft, antifriction bearings 13 and 14 supporting the gear being mounted in a recessed part of the adjacent end wall 15 and in an inward annular extension 16 from the wall, respectively. The extension 16 affords a substantially cylindrical chamber interiorly relieved between the bearings and stiffened exteriorly by a number of webs 17.

Immediately adjacent and inwardly of the extension 16 a drum hub 18 is splined on a sleeve 18' revoluble on the shaft and operatively connected to the shaft by differential means not shown. The hub is rabbeted at its outer end to accommodate antifriction bearing 19 supporting the hub and based on the inner end of the gear sleeve 12 which stops at the inner side of the rabbet.

The hub is formed with a circumscribing cylindrical drum seat 20 at its outer end, integral with which, and spaced from one extremity of the seat, there is a number of peripheral spaced radial lugs or flanges 21. A drum 22 is provided, having an annular web flange 23 finished to fit at its inner edge on the seat 20, beside the lugs 21. Bolts 24 are engaged, though the lugs and flange, held with locked nuts, by which the flange is drawn tightly on to the seat and against the lugs. The drum has a broad rim formed with a multiplicity of circumscribing V-grooves 25 (five being shown) of uniform depth and closely spaced axially on the drum, the sides of each groove being disposed at an angle of approximately forty degrees to each other, measured in a radial plane. The width of the groove is thus approximately ⅝ of the altitude of the vertex of the angle subtended. The bottoms of the grooves, however, are not formed by an angular junction of the sides, but are rounded a distance short of the geometrically projected vertex of opposite elements of the groove sides. The case 10 includes a top plate portion 27 somewhat below the top of the drum, and on this there is formed an oblique forwardly inclined cupola extension 28 over and around the drum, having an opening 29, bounded by an inclined rear wall 30, and inner and outer vertical side walls 31 and 32 formed integrally with the flat top plate. The forward edge of the opening is at the level of the top plate and this and the other edges of the opening 29 formed by the walls named are finished in a plane inclined upwardly from front to rear. A cover plate 33 is bolted over the opening 29 on which there is a central raised operator and adjuster housing 34. The side walls of the housing 34 are formed with bushed bearings 35 in which there is revolubly mounted a brake-operating rock shaft 36, enlarged within the housing, one end of the shaft stopping within the wall of the housing where the opening is closed outwardly of the shaft by a plug disc 36', the opposite end of the shaft being extended through the side of the housing and an operating lever 37 fixed thereon. Near respective ends the enlarged part of the shaft in the housing has two cylindrical parallel diametrical openings 38 therethrough normal to the shaft axis. Two studs 39 on a toggle yoke 40 are slidably inserted through these openings from one side, these studs having a length substantially greater than the diameter of the shaft. The yoke 40 consists of a broad, bored bearing eye 41, with its axis parallel to the shaft, from one side of which there are extended divergent arms 42 substantially in a radial plane from the eye, and at a distance from the eye 41 the arms are extended as stud bases 43 in a plane oblique to that in which the arms are laid, and in a plane parallel to and spaced from the shaft and the eye 41, the bases being also spaced apart more than the width of the eye. Set in the bases there are respective studs 39 which are thus in a common plane at an acute angle to the plane of the arms 42, so that the axis of the eye is spaced only a short distance from the plane of the studs and is near the shaft 36. From each of the bases 43 parallel short arms 44 are extended obliquely from the plane of the bases 43, toward the same side on which the studs extend, and beside the shaft. At their extremities coaxial trunnions 45 are set, projecting toward but stopping short of each other and on an axis parallel to that of the eye 41 and slightly nearer the plane of the studs. With the studs 39 inserted in the shaft, the latter thus lies between the axes of the eye 41 and the trunnions 45.

The eye 41, located at the rear of the shaft, has a heavy pin 46 engaged therethrough, and projecting at each side, on which there are hung four anchor links 47, through the extremities of which a similar cross pin 48 is engaged, and to which pin there are also connected the extremities of five curved brake segments or shoes 50, laid in respective grooves 25 of the drum, and each having at each end pairs of transversely spaced radially extended ears 49 through one set of which the pin 48 is engaged. There is a chain series of the shoes laid around the drum in each groove, each two mutually adjacent shoes being connected by a short coupling link 51 laid between the ears 49 and connected thereto by cross pins 48. Each segment or shoe 50 has an inner portion conforming to the shape of the groove in cross section and stopping short of the bottom of the groove. They are made of material appropriate to brake use, heretofore known or which may become available, such as cast iron and bronze.

Between the two links 47 at each end of the cross pin 46, an anchor 52 is mounted on the cover housing, consisting of a stud piece set against a shoulder 53 on the inside of the housing over the links 47, the stud extending obliquely inward and downward toward the drum in a counter clockwise direction, and having a saddle bearing recess 54 across the end, into which the pin 46 is set. The anchor is provided with a bolt stud 55 in its base extended longitudinally therefrom and outward through the housing and secured by an exterior nut 56 which draws the anchor tightly against the shoulder 53. A plane normal to the shoulder 53 and through the middle of the saddle recess 54 is tangent to the arc of movement of the pin 46 with the shaft 36 and away from the seats 54 (should such movement occur), when the parts are assembled as shown in Figure 1, so that the pin 46 is free for movement away from engagement in the saddle recess in case of need, as will appear.

The opposite or forward end of the brake chain terminates close to a tangent of the drum passing closely inward of the trunnions 45, so that a line through the axes of the trunnions and of the last cross pin 48 in the brake segments is parallel to such tangent at a medial position (in their range of operative movement) of the principal operating parts connected to this end of the shoe chain.

Connected to the last cross pin at the forward end of the brake chain there is a connector 57, which is a fork head having five ears 58 alined with respective terminal brake segments and secured between the respective pairs of ears thereof by the pin 48. The connector has an interiorly threaded tubular shank 59, of substantial length, into which there is screwed an adjusting rod and link 60 which is extended upwardly and rearwardly at a slight inclination, between the inner ends of the trunnions 45 and through the top of the housing 34 and a distance beyond. Its upper end is formed with a hexagon head 61. The top wall of the housing is formed with a rabbetted opening 62 clearing the stem liberally and a dust excluding washer 63 is confined in the rabbet, closely fitted to the rod and retained by a cover washer 64.

A collar 65 is pinned on the rod close below the trunnions 45 to receive downward thrust of the trunnions, and on the rod over the trunnions there is a guide block 66 adapted to receive on its lower end the upward thrust of the trunnions. The rod is revoluble in the block and is formed with an integral enlarged collar or shoulder 67 resting on the upper side of the block, and located a distance below the top of the housing.

The block is supported for upward sliding and tilting movement with the rod by means of heavy pivot and guide pins 68 set in transversely bored bosses 69, on the housing, and also engaged through longitudinal slots 70 formed in opposite sides of the block 66 so that the block is supported thereon at its lower limit of movement and is free for upward movement of varying extent, according to the force of application in the brake operating connections, and the degree of wear of the shoes 50 before being adjusted. The pins 68 are held at their inner limits of movement in the bosses 69 by cotter pins 71 inserted through the bosses outwardly of the pins. The rod has formed in its surface a plurality of longitudinal shallow grooves 72 circumferentially spaced and extending from above the axis of the pins 68 to a distance therebelow which will include the full range of operative movement of the adjustment of the rod which may be expected in compensating for wear of the shoes 50 and drum grooves. Each pin 68 is axially bored at its inner end to receive a ball 73 slidably therein and a protractile spring 74 confined in at least one of these bores by a respective ball 73, so that the ball is thrust inward against the rod and will partly engage in each groove passing when the rod is rotated, so as to hold the rod yieldingly in adjusted positions.

In operation, when the parts are assembled as described, the released position is as shown in full lines in Figure 1. At this position the rod may be rotated to draw the brake chain closer to the drum, by screwing the rod further into the shank of the connector 57, thus drawing the latter upward on the rod, without disturbing the operative connections. Likewise, additional clearance may be afforded by unscrewing of the rod. It should be understood that the normal rotation of the drum is clockwise in Figure 1.

On application of braking force to the lever 37, the shaft 36 is rotated over a small angle in a clockwise direction, as viewed in Figure 1. This tends to draw the pin 46 and rear end portion of the brake chain forwardly, and raises the trunnions 45 against the block 66 which is thus thrust against the shoulder 67 of the rod 60. This draws the connector 57 and forward end of the brake chain upward, tightening the engagement of the shoes on the drum. Rotation of the drum will act on the shoe chain, holding the pin 46 rearward to its seats in the anchor studs 52.

This involves a slight diametrical slippage of the studs 39 in the shaft 36 to compensate for the pivotal movement of the yoke 40 on the pin 46 as a fulcrum as the trunnions swing upwardly. The movement required for full application is very slight so that the movement of the studs 39 in the shaft will be still smaller.

Release movement of the lever 37 involves a reverse sequence in functions, counterclockwise movement of the shaft 36 forcing the brake shoes to release the drum.

In the brake applying operation, the rod 60 and block 66 move upwardly relatively to the pins 68, which consequently have lower positions in the slots 70 for the time being, and the ball 73 travels in the registered groove 72, holding the rod against rotation at all times.

In case of application of the brake while the drum is rotating in a counterclockwise direction the draft on the chain of shoes is communicated to the rod, and through its collar 67 and block 66 to the heavy pins 68. At the same time, rotation of the shaft 36 carrying the yoke 40, draws the pin 46 from the seats in the anchor studs 52, the studs 39 tending to draw slightly from their initial position in the shaft 36.

The brake thus has a double anchor function and structure so that torque or "winding" in either direction is transmitted to heavy case parts and does not oppose movement of the leverage.

In this construction the advantages of the uniform frictional contact of the band brake are attained, while at the same time the advantage of rigid type metal shoes may be fully availed of. However, the operative and adjustment connections described may be used with other constructions of shoe elements including flexible bands.

It should be appreciated that the construction of the yoke is such that connections between opposite ends of a flexible or other brake member may be made with an operating rock member on extremely short radii while still enabling constant compensation for changes in directional components of the forces applied and the resistance stresses in the brake parts.

It should also be noted that as the shoe segments wear the axes of the cross pins 46 and 48 move inward toward the drum. This involves a slight compensating pivotal inward swing of the rod 60 at its lower end the pins 68 serving as the pivots. The block 66 has a slight similar movement, and it may be seen in Figure 1 that this block is bevelled or tapered on two sides intermediately of the slot 70 to afford ample clearance adjacent the shaft 36. On the intervening end portions the block is of a thickness from its bore to its outer face equal to the length of the trunnions 45, as may be seen in Figure 2.

It may also be noted that this brake is currently used in oil, so that when released a film of oil forms between the faces of the drum grooves and the shoes, requiring no springs to effect clearance. In the release movement of the shaft 36, the trunnions 45 press downward on the collar 65, forcing the shoes to disengage, and in consequence no springs opposing application movements are required. Under release movement of the shaft 36 when the drum is rotating counterclockwise, the movement of the yoke thrusts the pin 46 rearwardly to its seats in the anchors 52, and at the same time pushes the links 47 and adjacent shoes rearward to released positions.

This brake has formed a part of a controlled differential drive system in tanks wherein when the brake drum is locked against rotation the rate of rotation of the shaft 11 is reduced but not stopped, and in such use has been found exceptionally effective. It may, however, be used also in other types of transmissions as will be apparent.

The invention has been found highly advantageous in use in tanks, by reason of the single simple adjustment required to compensate for wear and to keep the brake in highly effective operative condition.

The links and shoes are slidable on the pins 46 and 48 so that good alinement of the direction of application of force to the brake shoes is automatically effected and maintained, thus avoiding unequal wear of the faces of the shoes due to misalinement and also correcting alinement in case of unequal wear on opposite sides of a shoe due to faults in material, or axial displacement of the drum.

I have disclosed the invention with particularity in the best form in which it has been developed at this time, but it will nevertheless be understood that changes in the construction, arrangement, and combination of parts, substitution of materials and equivalents mechanical or otherwise may be made without departing from the spirit of the invention within the scope of the appended claims, wherein I claim:

1. In a brake, a drum, a rock shaft close to the drum mounted on an axis parallel to that of the drum, means to rock the shaft, a flexible brake device extended around the drum, a yoke device having a diametrically slidable connection with the shaft, and having opposite arms extended beside the shaft and connected to respective ends of said brake device, and a fixed anchorage for one of said connections.

2. In a brake of the character described a brake operating member of limited movement, a direct brake connection member, a mounting, a guide device pivoted thereon on an axis transverse to the direction of movement of said operating member, an adjusting member slidable and revoluble therein on an axis coincident with said direction and having screw engagement with said connection member, means to limit sliding movement of said adjusting member in one direction, said operating member having a revoluble non-sliding connection with said adjusting member.

3. In a brake of the character described a brake connecting member, a mounting, a guide pivoted thereon and slidable away from and toward said connecting member, an adjusting rod engaged revolubly through said guide and having screw engagement with said connecting member means to limit sliding movement of the adjusting rod in the direction of said connection and a brake operating member revolubly engaged with the rod.

4. The brake structure of claim 3 in which said mounting comprises opposed pivot pins adjacent opposite sides of said rod, said guide having longitudinal slots receiving said pins and constituting part of said means to limit sliding movement of the adjusting rod.

5. The structure of claim 3 in which said mounting comprises opposed pivot pins in close radial relation to said rod said guide having longitudinal slots receiving the pins at least one of said pins having a spring loaded rounded wiper thereon, said rod having a plurality of longitudinal grooves adjacent said wiper and extending a distance equal to the range of movement of said rod there adjacent.

6. The structure of claim 1 in which said anchorage consists of a saddle bearing having its open side presented in a direction opposite normal rotation of the drum and in the direction of application movement of the adjacent said connection between the yoke and brake device.

7. In a brake, a revoluble brake drum, a shaft revoluble on an axis parallel to that of the drum, a flexible shoe device around the drum, a fixed anchorage engaged with one end thereof adjacent the shaft, angularly spaced eccentric connections between the shaft and respective ends of said shoe device, and means to rock the shaft, said anchorage being an abutment device, said brake device having a part at one end constructed and arranged to engage the abutment under rotation with the drum in one direction said eccentric connections comprising a rigid member radially movable on said shaft and having respective ends of the brake device connected thereto for application of draft forces in respective directions, under rotation of the shaft.

8. In a brake of the character described, a multiple grooved drum, a flexible shoe device in respective grooves thereof each consisting of a plurality of separate rigid groove-fitting segments connected in chain relation in each groove and draft connections at each end of the shoe, said connections between segments and at least one draft connection each including a transverse pivot pin, said segments being engaged for lateral slidable movement on the pin in variable mutually spaced relation whereby automatic lateral adjustment of the segments on said pin will occur under unbalanced pressure of the segments against the sides of the grooves.

HARRY A. KNOX.